(12) United States Patent
Ireland

(10) Patent No.: US 9,464,745 B2
(45) Date of Patent: Oct. 11, 2016

(54) LARGE DIAMETER FIBERGLASS TANK ADAPTER

(71) Applicant: Steven Ireland, Long Beach, CA (US)

(72) Inventor: Steven Ireland, Long Beach, CA (US)

( * ) Notice: Subject to any disclaimer, the term of this patent is extended or adjusted under 35 U.S.C. 154(b) by 553 days.

(21) Appl. No.: 13/666,057

(22) Filed: Nov. 1, 2012

(65) Prior Publication Data
US 2014/0117662 A1 May 1, 2014

(51) Int. Cl.
*F16L 41/08* (2006.01)
*B65D 90/54* (2006.01)

(52) U.S. Cl.
CPC .............. *F16L 41/086* (2013.01); *B65D 90/54* (2013.01); *F16L 41/08* (2013.01)

(58) Field of Classification Search
CPC ........ F16L 41/06; F16L 41/065; F16L 41/08; F16L 41/086; F16L 41/12
See application file for complete search history.

(56) References Cited

U.S. PATENT DOCUMENTS

| | | | | | |
|---|---|---|---|---|---|
| 1,520,230 | A | * | 12/1924 | Flath ............................ | 137/551 |
| 4,492,392 | A | * | 1/1985 | Woods et al. ................ | 285/119 |
| 5,056,680 | A | * | 10/1991 | Sharp ......................... | 220/567.1 |
| 5,374,087 | A | * | 12/1994 | Powers ................... | F16L 41/06 |
| | | | | | 285/133.21 |
| 5,492,373 | A | * | 2/1996 | Smith ...................... | 285/148.19 |
| 5,553,898 | A | * | 9/1996 | Rogers, Jr. ............. | F16L 41/06 |
| | | | | | 137/317 |
| 5,660,418 | A | * | 8/1997 | Crawford .................. | 285/125.1 |
| 6,318,581 | B1 | * | 11/2001 | Garton ........................ | 220/565 |
| 6,634,676 | B1 | * | 10/2003 | Lampson et al. ........ | 285/123.15 |
| 2013/0019981 | A1 | * | 1/2013 | Yandle et al. ................. | 138/42 |

\* cited by examiner

*Primary Examiner* — James Hewitt
(74) *Attorney, Agent, or Firm* — Fulwider Patton LLP

(57) ABSTRACT

An adapter for a cylindrical polyethylene comprises a tubular body section, a saddle-shaped flange connected at a first end to the tubular body section, and adapted to mate with an outer surface of the cylindrical tank, the saddle-shaped flange including a bolt hole pattern having a first spacing. A circular flange connected to a second end of the tubular body section, the circular flange having a bolt hole pattern having a second spacing, wherein the first bolt hole spacing is one half the second bolt hole spacing.

6 Claims, 2 Drawing Sheets

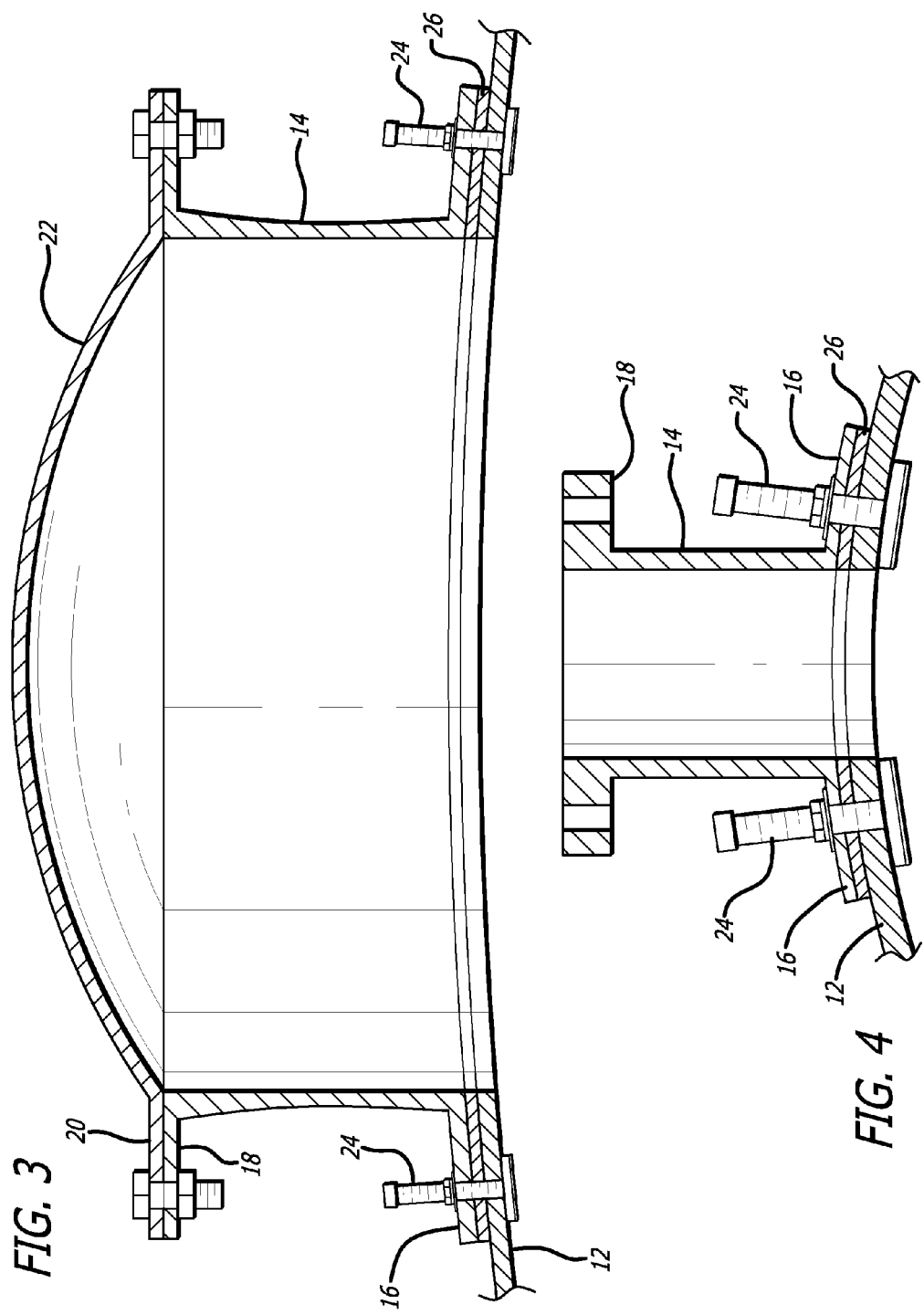

LARGE DIAMETER FIBERGLASS TANK ADAPTER

BACKGROUND

Large industrial storage tanks are a staple of many industries that store liquids in large quantities, including water, waste, chemicals, brine, and the like. While these tanks have traditionally been constructed of metal, newer tanks have switched to a fiberglass construction because they are lighter, corrosion-resistant, and less expensive. These fiberglass tanks are less effected by temperatures and can be made larger to handle higher storage requirements. In many cases, fiberglass tanks are more resistant to seismic activity and can sustain higher pressures than metal tanks. For these reasons, their use has become more common in many different industries.

Fiberglass tanks in many instances require that a port or pathway be cut into the side of the cylindrical tank to pump liquids into or out of the tank. Once a port is cut into the tank, an adapter is needed to couple the pumping equipment to the tank. The adapter may have a planar surface on one end to connect to a pump or conduit, and a saddle shaped configuration at the opposite end to conform with the outer wall of the tank. There are unique challenges to creating an adapter for a fiberglass tank that will resist leaking and bond with the fiberglass surface of the tank. The present invention is adapted to take on those challenges.

SUMMARY OF THE INVENTION

The present invention is a tank adapter that mates with an outer surface of a cylindrical tank over a port, providing closure to the port and accessibility to the tank's interior. The adapter is saddle shaped to mate with the tank's exterior, and includes an augmented bolt pattern to resist leakage across the juncture with the flexible tank skin. The opposite end is a regular flange with a traditional bolt pattern per ANSI standards. In a preferred embodiment, the opposite end is fitted with a cover to enclose the adapter.

BRIEF DESCRIPTION OF THE DRAWINGS

FIG. 3 is a cross sectional view of the adapter of FIG. 1; and

FIG. 4 is a cross sectional view of a second, smaller adapter.

DETAILED DESCRIPTION OF THE PREFERRED EMBODIMENTS

Figure 1:
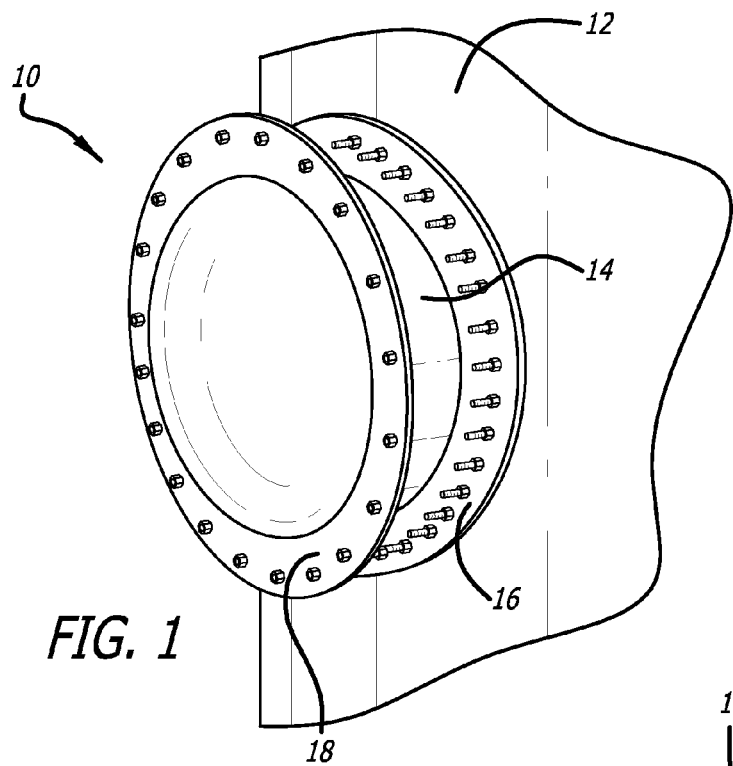
FIG. 1 an elevated, perspective view of the adapter of the present invention.
Figure 2:
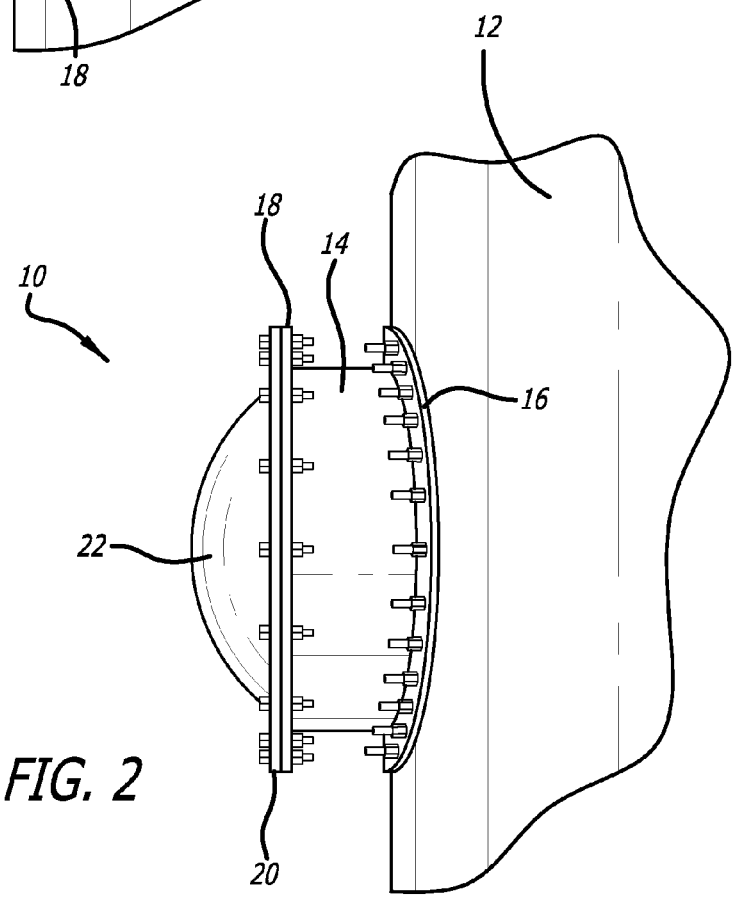
FIG. 2 is a side view of the adapter of FIG. 1.

As shown in FIGS. 1-4, the present invention is an adapter 10 that can be fitted and secured to the side of a polyethylene tank (or other tank material) 12 and used to gain either access or provide a port for the tank. As shown in FIG. 1, the adapter 10 is constructed of a tubular body 14 with flanges 16,18 at respective ends. A first flange 16 is saddle shaped, i.e., it is adapted to mate with the outer surface of a large polyethylene tank 12, while the second flange 18 is circular and adapted to mate with another circular flange 20. Over the circular flange 18, a hemispherical cover 22 can be added to enclose the adapter 10 and prevent ingress into the tank 12.

To place the adapter 10 on the tank 12, the installation begins by selecting a location on the tank 12 to place the adapter 10. The location should be a couple of feet from the ground, and away from any mold lines on the tank if possible. A hole is then cut into the tank 12, such as for example a twenty-four inch hole. Other holes are possible, depending upon the size of the adapter 10. The next step is to place the adapter 10 against the tank 12 so that the tubular portion 14 of the adapter 10 is aligned with the just cut hole, and the bolt holes are marked at the top (or near the top). Two holes are then drilled at the markings, such as 9/16" holes, and the adapter 10 is bolted to the tank 12. The remainder of the bolt holes are then marked and drilled around the hole. At this point, it is advisable to inspect the interior of the tank wall for cracks or damage from the drilling operation. Any incongruity or discontinuity that could lead to an uneven contact with the adapter 10, which could cause leakage, should be smoothed or removed. The remaining bolts 24 are then fastened after placing an EPDM gasket 26 between the tank 12 and the adapter 10, using an anti-seizing compound. The bolts 24 are tightened to approximately 25 ft/lb of torque to complete the installation.

The adapter 10 can be constructed of various materials, including 304 Stainless Steel, polyvinyl chloride, 316 Stainless Steel, C-276 (Hastelloy), titanium, and fiberglass. The gaskets 26 can be made of EPDM or Viton, and is preferably 0.25" thick. The most common sizes (adapter diameters) include six, eight, ten, twelve, fourteen, sixteen, eighteen, twenty, and twenty four inches. The bolts 24 are preferably ½"×3.5" alloy core bolts with PVC encapsulated heads for attaching the fitting to the tank 12.

There are no currently available adapters 10 that can mate with large polyethylene tanks 12, but leakage would be a challenge if such adapters 10 existed. To compensate for the more pliable nature of the polyethylene tanks 12, the adapter 10 must be secured in a manner that is more stringent than ANSI standards. To overcome this, the bolt hole pattern spacing on the saddle flange 16 must be smaller than the bolt hole pattern on the circular flange 18, and preferably twice as small. Thus, if the circular flange 18 bolt hole spacing is equal to the ANSI specification, then the saddle flange 16 bolt hole pattern includes twice as many bolts 24. This closer spacing prevents undulation/warping that can occur with a larger spacing due to the flexible characteristic of the tank 12, which can lead to leakage between the bolts 24. Other bolt patterns for the saddle can be in the ratio of 3:2 and 4:3, among others.

To manufacture the adapter 10 of the present invention, one may start with a molded FRP fitting. The saddle flange 16 is created first, usually ⅝" to ¾" thick made from FRP matrix, and the neck is created from the same material. The saddle flange 16 is made from ¼" layers that are successively stacked until the desired thickness is achieved. The saddle flange 16 is then bonded to the neck of the tubular body 14 portion during the fabrication process to achieve optimal strength and minimize leakage. The neck of the flange is cut to match the radius of the saddle flange 16. Once the saddle flange 16 is completed, it is trimmed, the bolt pattern is drilled, and all excess resin and glass residue is removed. The completed adapter 10 is then matched with the specific attachment hardware (316L Stainless Steel, Titanium, or Hastelloy/C276) and the specified gasket (EPDM, Viton, PE Foam or Teflon).

I claim:

1. An adapter for a cylindrical polyethylene tank, comprising:
   a tubular body section;

a pre-formed saddle-shaped flange connected at a first end to the tubular body section, and adapted to mate with an outer surface of the cylindrical tank, the saddle-shaped flange including a circumferential bolt hole pattern having a first spacing;

a circular flange connected to a second end of the tubular body section, the circular flange having a circumferential bolt hole pattern having a second spacing;

wherein the first bolt hole spacing is one half the second bolt hole spacing.

2. The adapter for a cylindrical tank of claim 1, including a spherical cap fitted over the circular flange.

3. The adapter for a cylindrical polyethylene tank of claim 2, where the saddle-shaped flange is made of fiberglass.

4. The adapter for a cylindrical polyethylene tank of claim 3, where a diameter of the tubular body section is twenty four inches.

5. The adapter for a cylindrical polyethylene tank of claim 3, where a length of the tubular body section is eight inches.

6. The adapter for a cylindrical polyethylene tank of claim 2, wherein the adapter is constructed of a material selected from the group consisting of 304SS steel, 316SS steel, C-276, and titanium.

* * * * *